United States Patent [19]

Rionda et al.

[11] Patent Number: 4,486,115
[45] Date of Patent: Dec. 4, 1984

[54] CONNECTOR PLATES

[75] Inventors: Carlos Rionda; Robert Gottlieb, both of Miami, Fla.

[73] Assignee: Gang-Nail Systems, Inc., Miami, Fla.

[21] Appl. No.: 354,038

[22] Filed: Mar. 2, 1982

[51] Int. Cl.³ .............................................. B25G 3/28
[52] U.S. Cl. .................................. 403/283; 403/405; 411/466; 52/DIG. 6
[58] Field of Search .............. 403/283, 405, 406, 407; 52/DIG. 6, 713; 411/459, 466, 467, 468

[56] References Cited

U.S. PATENT DOCUMENTS

| | | | |
|---|---|---|---|
| 2,877,520 | 3/1959 | Jureit | 403/283 |
| 3,454,292 | 7/1969 | Sanford | 403/283 |
| 3,841,195 | 10/1974 | Jureit | 411/459 |

FOREIGN PATENT DOCUMENTS 1287739  9/1972  United Kingdom ................ 411/467

Primary Examiner—Andrew V. Kundrat
Attorney, Agent, or Firm—LeBlanc, Nolan, Shur & Nies

[57] ABSTRACT

A connector plate assembly for joining wooden structural members is disclosed. The plate assembly includes a pair of plate members, each of which is provided with a plurality of teeth extending outwardly therefrom and with slots for receiving teeth from the other plate member. These slots are so arranged as to allow the two plate members to be aligned in face to face contact, with teeth extending from each plate member through slots in the other plate member. The teeth thus project from opposite sides of the plate assembly for embedment in the structural members to be joined.

11 Claims, 7 Drawing Figures

CONNECTOR PLATES

BACKGROUND AND SUMMARY OF THE INVENTION

The present invention relates to metal connectors and more particularly to hidden fasteners for connecting and joining wooden structural members.

The joinder of structural load bearing wooden members has been significantly advanced by the advent of structural wooden joints which are connected solely by means of metal plates having nail-like teeth struck therefrom and embedded into the wooden members, such as illustrated in Jureit U.S. Pat. No. 2,877,520. Plates of this type wherein the teeth serve as the only means holding the plates onto the wooden members and the wooden members in adjoining relation have proved eminently successful particularly in the building industry. Various arrangements and configurations of teeth in the plates have been proposed and constructed in the past for specific purposes and to solve particular problems associated with utilization of connector plates of this type.

The present invention provides a novel and improved metallic connector assembly intermediate wooden structural members prior to the compression of these members onto the connector assembly. The present connector assembly includes a pair of substantially planar plates each having a plurality of teeth struck therefrom. Each of the planar plates is provided with a series of apertures which align with the teeth from the other plate so that the plates may be interengaged with the planar portions thereof in face to face contact, and with teeth from one plate extending through and being exposed outwardly in opposite directions from opposite sides of the connector assembly. Thus each of the pair of connector plates employed in the assembly of the present invention is constructed as an individual plate having teeth struck therefrom and may be used individually, such as in the joining of structural members. Alternatively, with the pair of plates aligned so that the teeth of each plate pass through the slots or apertures of the other plate, there is obtained a connector plate assembly which may be employed to join wooden structural members, with the joined plates providing a secure unitized construction. The connector plate assembly of the present invention is particularly useful when employed in wooden beams in building construction and in the construction of columns for buildings such as agricultural buildings. Other uses of the present connector assembly would include the manufacture of furniture.

The construction of the present invention is distinguished over the multi-piece connectors as described in U.S. Pat. No. 3,454,292 to Sanford, in that the interengaging members of the multi-piece connectors of U.S. Pat. No. 3,454,292 employ an arrangement in which only one of the two locking members is provided with teeth which pass through apertures in the other locking member. Both locking members have embedment teeth for attachment to their respective structures to be joined.

The present invention is also distinguished from the two sided fastener of U.S. Pat. No. 3,841,195 to Jureit in which the connector assembly includes back-to-back connector plates which are welded prior to assembly.

It is accordingly an object of the present invention to provide a novel and improved apparatus and method for the joining of wooden members.

It is also an object of this invention to provide a low cost method and apparatus for connecting wooden structural members.

It is a further object of this invention to provide a novel connector plate assembly utilizing a pair of interengaging connector plates which may be employed together or separately.

It is a further object of this invention to provide a novel and improved connector assembly for the joining of wooden structural members utilizing an interengaged pair of connector plates from which extend nail-like teeth on opposite sides of the assembly.

It is another object of this invention to provide a novel and improved method for connecting structural members in which a novel hidden fastener is placed between structural members and the structural members compressed thereon, the novel hidden fastener providing the joint formed thereby with exceptional strength and resistance to shear and transverse forces even with surfaces of limited contacting areas.

BRIEF DESCRIPTION OF DRAWINGS

The foregoing objects and advantages will become more readily apparent from the following description of the preferred embodiments, taken in conjunction with the accompanying drawings, wherein.

DESCRIPTION OF THE PREFERRED EMBODIMENTS

Figure 1:
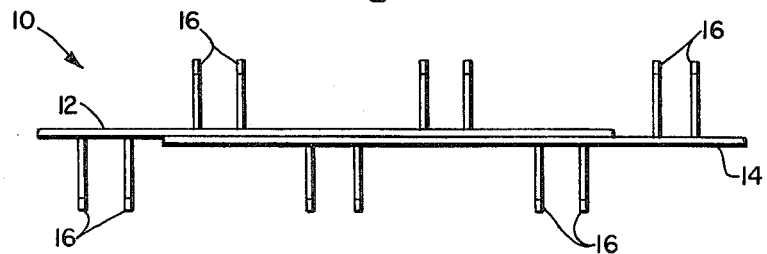
FIG. 1 is a side elevational view of the connector plate assembly of the present invention, showing the plates operatively engaged.
Figure 2:
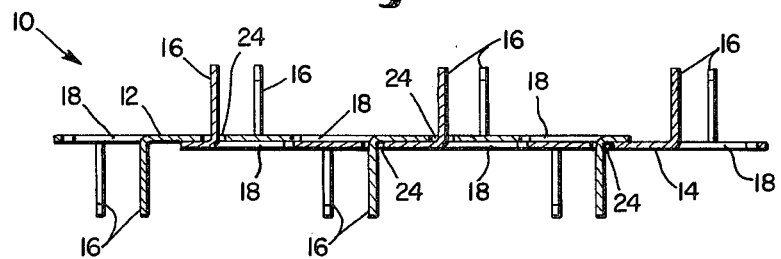
FIG. 2 is a side cross-sectional view of the connector plate assembly of FIG. 1.
Figure 3:
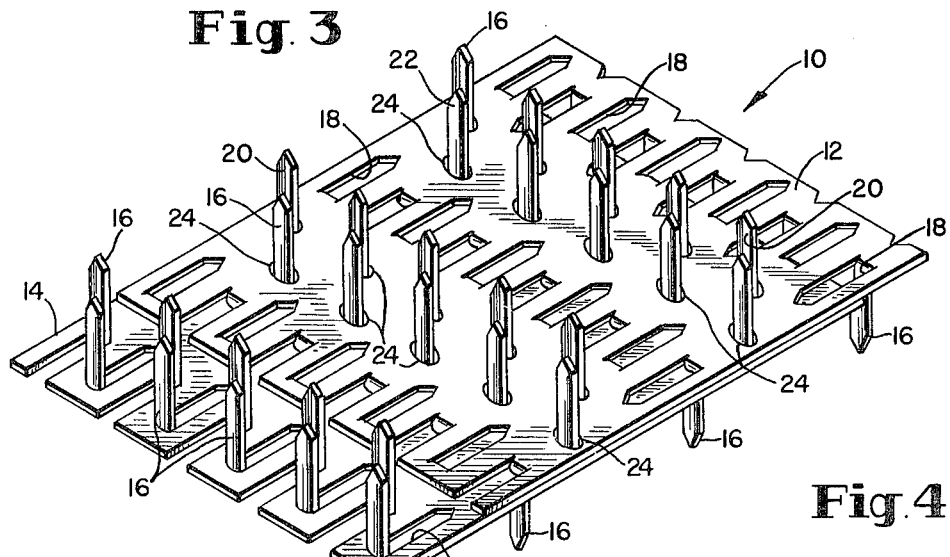
FIG. 3 is a perspective view of the connector plate assembly of FIG. 1.
Figure 4:
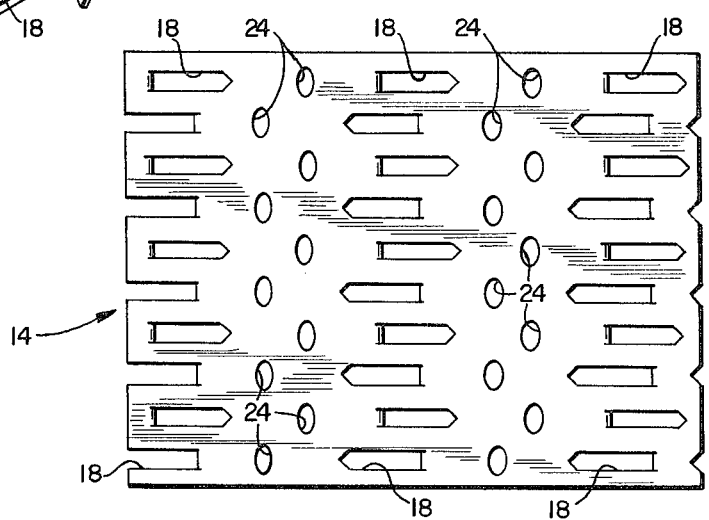
FIG. 4 is a bottom plan view of a single connector plate of the plate assembly of FIG. 1.
Figure 5:
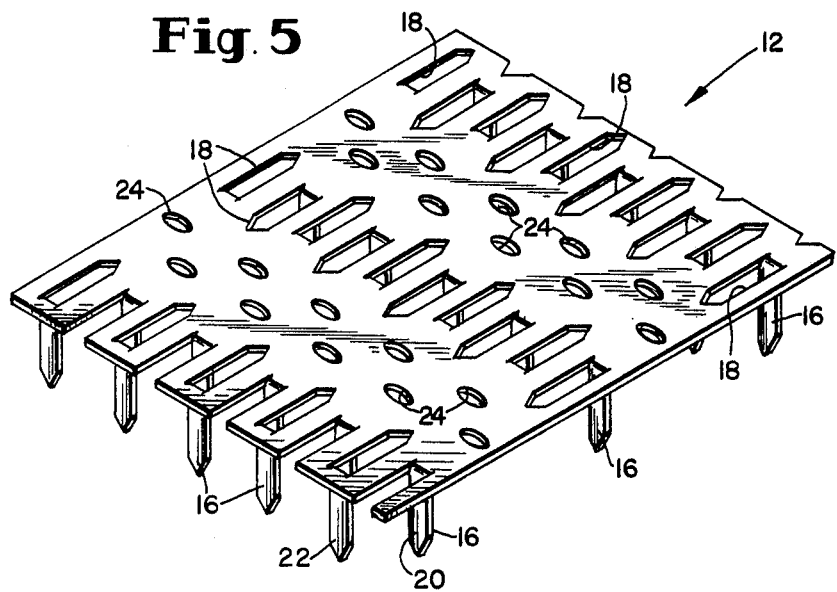
FIG. 5 is a perspective view of the connector plate of FIG. 4.
Figure 6:
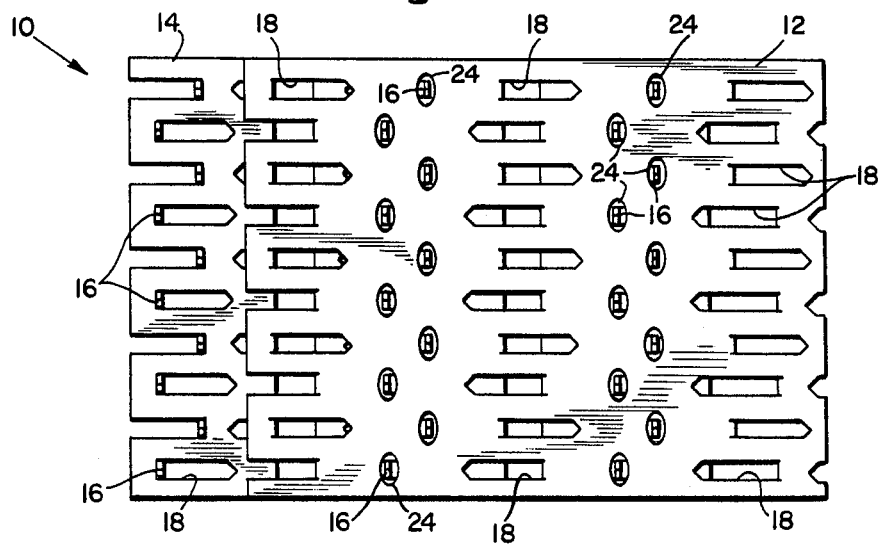
FIG. 6 is a top plan view of the connector plate assembly of FIG. 1.

In the embodiment of the present invention as shown in FIGS. 1-7, there is provided a connector plate assembly 10 including a top plate 12 and bottom plate 14 which are operatively engaged one to the other prior to forming a joint. Each of the connector plates is a sheet metal plate having struck therefrom a plurality of longitudinal rows of slender, elongated nail-like teeth 16 which leave longitudinal rows of elongated slots 18 as shown in FIGS. 3-5. A method of forming teeth 16 is described, for example, in U.S. Pat. No. 3,731,583, commonly assigned, which is incorporated herein by reference. Teeth 16, which are of approximately uniform length, depend outwardly on opposite sides of the connector assembly in a direction generally perpendicular to the plates 12, 14 of the connector assembly and are embedded in the wooden member to be joined in any suitable manner, preferably by the application of pressure between the structural members to be joined as by a suitable press.

In one embodiment, teeth 16 in any of the longitudinal rows are struck in the same direction, as shown in FIGS. 3 and 5, so that the slots 18 which are left extend from the teeth in the same direction while teeth 16 in next adjacent rows are struck in an opposite direction such that the slots in adjacent longitudinal rows extend from the teeth in opposite directions. Each tooth 16, in one embodiment, is generally V-shaped in cross-section, having a generally concave punch face 20 and a generally convex back face 22. The teeth in each plate 12, 14 are preferably arranged in repeating patterns of two rows of teeth 16 and slots 18 extending transversely across the plate, with two rows of apertures 24 being located transversely across the plate between successive patterns of the two transverse rows of teeth 16 and slots 18. In the two row transverse patterns of teeth 16 and slots 18, the teeth 16 of each row are preferably arranged so that the concave faces 20 are located facing inwardly toward the other row of teeth 16.

The apertures 24 may be formed by the use of a suitable punch and die assembly and each aperture 24 is of a size just large enough to accept the entry of a tooth 16 as closely as easy assembly will permit to void excessive play between the two plates 12, 14 after assembly. Such apertures 24 are aligned in the same longitudinal rows as the slots 18. In the embodiment shown in FIGS. 1–7 each aperture 24 is in the shape of an ellipse with the major axis thereof extending transversely to the plate. Alternatively, the apertures 24 could have other shapes, such as a rectangle with the longer dimension extending transversely to the plate. It is into these apertures 24 that the teeth 16 from the adjacent connector plate fit, when plates 12, 14 are interengaged in face to face contact for the purpose of providing a laminated or abutting joint.

In the case of the double transverse rows of teeth 16 and slots 18, the rows overlap in the transverse direction, as shown, for example, in FIG. 4. In one embodiment the slots 18 overlap to the extent of approximately one-half the total length thereof.

Figure 7:
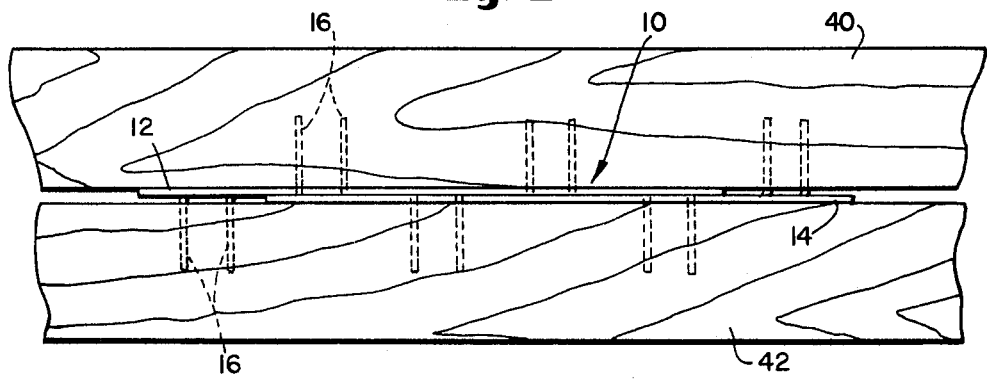
FIG. 7 is a side elevation of wooden structural members, showing the connector plate assembly of FIG. 1 embedded therein.

Referring to FIG. 7, a joint including two wooden members 40 and 42 is illustrated as being joined by connector assembly 10. The hidden fastener function can clearly be seen in this figure, with the fastener being hidden from view by the members to be joined. As can be seen, the interengaged plate assembly 10 is embedded in both wooden structural members so as to form a laminated or abutting joint. It will be understood that in some uses, such as in the manufacture of furniture, the hidden fastener may be used either without adhesives or with adhesives for holding the fastener in the furniture. It will also be appreciated that the connector assembly of the present invention is particularly suitable wherever unusual joint stability is required and wherever there is a limited contact area in which to embed the fastener. The plate assembly of the present invention is provided with additional strength due to the double thickness of plate material which results when the two plates 12, 14 are in face to face alignment. What has therefore been provided is a hidden fastener which is highly resistant to shear and torsional stresses and which allows wooden structural members to be joined in a secure unitized construction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed:

1. A connector plate for joining first and second members, comprising:
a plate member having a plurality of teeth struck therefrom and extending outwardly from the plate, said teeth being located at longitudinally spaced positions along the plate with slots left by the striking of said teeth extending away from the base of said teeth, said plate member having a plurality of apertures which are so aligned with said teeth as to be capable of receiving and interengaging with the teeth of a second plate member, such interengagement providing for both plate members to be joined in face to face contact when aligned and with teeth extending from each plate member through apertures in the other plate member, said teeth being arranged in repeating patterns of two rows of teeth and slots extending transversely across the plate, with two rows of apertures being located transversely across the plate between successive patterns of two transverse rows of teeth.

2. The connector of claim 1 wherein said apertures are of a size just large enough to accept the entry of a respective tooth from the other plate as closely as easy assembly will permit to avoid excessive play between the two plates after assembly.

3. The connector of claim 1 wherein the two rows of teeth and slots in each repeating pattern overlap in the transverse direction, to the extent of approximately one-half the total length of the slots.

4. A connector plate assembly for joining first and second members, comprising:
a pair of plate members, each plate member having a plurality of teeth struck therefrom and extending outwardly from the plate, said teeth being located at longitudinally spaced positions along the plate with slots left by the striking of said teeth extending away from the base of said teeth, each plate member having a plurality of apertures which are so aligned with the teeth of the other plate as to receive the teeth of said other plate member, said plate members being joined in face to face contact with teeth extending from each plate member through apertures in the other plate member, the teeth of each plate being arranged in repeating patterns of two rows of teeth and slots extending transversely across the plate, with two rows of apertures being located transversely across the plate between successive patterns of two transverse rows of teeth.

5. The connector assembly of claim 4 wherein said apertures are of a size just large enough to accept the entry of a respective tooth from the other plate as closely as easy assembly will permit to avoid excessive play between the two plates after assembly.

6. The connector assembly of claim 4 wherein the two rows of teeth and slots in each repeating pattern overlap in the transverse direction, to the extent of approximately one-half the total length of the slots.

7. A method of joining first and second structural members which comprises:
(a) aligning a pair of plate members in face to face contact, each plate member having a plurality of teeth struck therefrom and extending outwardly from the plate, said teeth being located at longitudinally spaced positions along the plate with slots left by the striking of said teeth extending away from the base of said teeth, each plate member having a plurality of apertures which are so aligned with the teeth of the other plate as to receive the teeth of said other plate member, the teeth of each plate being arranged in repeating patterns of two rows of teeth and slots extending traversely across the plate, with two rows of apertures being located transversely across the plate between successive patterns of two transverse rows of teeth; and (b) pressing the teeth of said plate members into the structural members to be joined.

8. A joint comprising: first and second wooden members connected by a pair of plate members in face to face contact, each plate member having a plurality of teeth struck therefrom and extending outwardly from the plate, said teeth being located at longitudinally spaced positions along the plate with slots left by the striking of said teeth extending away from the base of said teeth, each plate member having a plurality of apertures which are so aligned with the teeth of the other plate as to receive the teeth of said other plate member, allowing the teeth of the other plate member to pass through into one of the wooden members, the teeth of each plate being arranged in repeating patterns of two rows of teeth and slots extending transversely across the plate, with two rows of apertures being located transversely across the plate between successive patterns of two transverse rows of teeth.

9. A connector plate for joining first and second members, comprising:
- a plate member having a plurality of teeth struck therefrom and extending outwardly from a common side of said plate, said teeth being located at longitudinally spaced positions along the plate;
- a plurality of apertures located at longitudinally spaced positions along the plate with at least one aperture being located between successive, longitudinally spaced teeth;
- said teeth and said apertures being aligned in respective transverse rows extending across the plate;
- said teeth in any one of the longitudinal rows being struck in the same direction and with the slots left by the striking of said teeth in said any one row extending in the same direction while the teeth in the next adjacent row are struck in an opposite direction such that the slots in adjacent longitudinal rows extend from the teeth in opposite directions.

10. The connector of claim 9 wherein said apertures are of a size just large enough to accept the entry of one of said teeth from a second plate member.

11. The connector of claim 9 wherein each respective transverse row of teeth is devoid of any of said apertures and wherein each respective transverse row of apertures is devoid of any of said teeth.

* * * * *